(12) United States Patent
Kangas

(10) Patent No.: US 7,633,436 B2
(45) Date of Patent: Dec. 15, 2009

(54) SATELLITE-BASED POSITIONING OF MOBILE TERMINALS

(75) Inventor: Ari Kangas, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 40 days.

(21) Appl. No.: 10/589,752

(22) PCT Filed: Feb. 16, 2005

(86) PCT No.: PCT/SE2005/000213

§ 371 (c)(1),
(2), (4) Date: Aug. 17, 2006

(87) PCT Pub. No.: WO2005/078474

PCT Pub. Date: Aug. 25, 2005

(65) Prior Publication Data

US 2007/0159384 A1    Jul. 12, 2007

Related U.S. Application Data

(60) Provisional application No. 60/545,194, filed on Feb. 18, 2004.

(51) Int. Cl.
*G01S 1/00* (2006.01)
(52) U.S. Cl. .................................. 342/357.02
(58) Field of Classification Search ................ 342/357.01–357.17
See application file for complete search history.

(56) References Cited

U.S. PATENT DOCUMENTS

| | | | |
|---|---|---|---|
| 6,169,957 B1 * | 1/2001 | Arethens | ..................... 701/213 |
| 6,191,729 B1 | 2/2001 | Arethens | |
| 6,466,164 B1 | 10/2002 | Akopian et al. | |
| 6,515,618 B1 | 2/2003 | Lupash | |
| 6,810,324 B1 * | 10/2004 | Nadkarni | ..................... 701/207 |
| 2002/0080064 A1 | 6/2002 | Kim | |
| 2004/0189515 A1 * | 9/2004 | Vannucci | ............... 342/357.01 |
| 2004/0239558 A1 * | 12/2004 | Geier et al. | ............ 342/357.06 |
| 2008/0036651 A1 * | 2/2008 | van Diggelen et al. | . 342/357.02 |

OTHER PUBLICATIONS

International Search Report of PCT/SE2005/000213, mailed Jun. 3, 2005.
Chinese Office Action w/ English translation (10 pages).

* cited by examiner

*Primary Examiner*—Thomas H Tarcza
*Assistant Examiner*—Nga X Nguyen
(74) *Attorney, Agent, or Firm*—Nixon & Vanderhye P.C

(57) ABSTRACT

The invention relates to satellite-based positioning of mobile terminals. Positioning with correction for errors in parameters measured at the mobile terminal is provided. The terminal location is first calculated (S2; S4') without error correction or with partial error correction. Hereby, a set of nonlinear equations with the UE location and the UE clock bias and possibly the transmission time offset as unknowns are defined, linearized and solved for the mobile terminal location. The quality of the result is determined and compared to a predetermined criterion (S3; S5). If the quality criterion is not fulfilled, the location of the mobile terminal is recalculated with additional error correction (S4, S4'; S6). The proposed method can involve correction for errors in a parameter for time of signal reception, or in a pseudorange parameter, or both. The error correction can be stepwise.

33 Claims, 6 Drawing Sheets

SATELLITE-BASED POSITIONING OF MOBILE TERMINALS

This application is the U.S. national phase of International application PCT/SE2005/000213 filed 16 Feb. 2005, and claims priority from U.S. Provisional Patent Application 60/545,194 filed 18 Feb. 2004 entire contents of which are hereby incorporated by reference.

TECHNICAL FIELD

The present invention generally relates to satellite-based positioning and in particular to positioning of mobile terminals of a land-based communication network that are capable of receiving signals from satellites.

BACKGROUND

In recent years, determination of the geographic position of an object, equipment or a person carrying the equipment has become more and more interesting in many fields of application. One approach to solve the positioning is to use signals emitted from satellites to determine a position. Well-known examples of such systems are the Global Positioning System (GPS) [1] and the coming GALILEO system. The position is given with respect to a specified coordinate system as a triangulation/trilateration based on a plurality of received satellite signals.

Assisted GPS (AGPS) [2] has been developed to facilitate integration of GPS receivers into mobile terminals (also referred to as user equipment, mobile stations, mobile nodes etc.) of cellular communication systems. Assisted GPS in general aims at improving the performance of GPS receivers in many different respects, including detection sensitivity, time to obtain a location estimate, accuracy and saving battery power. This is done by moving some functionality from the GPS receiver in the mobile station to the network and hence only performing a subset of the GPS tasks in the GPS receiver itself.

A stand-alone GPS receiver can obtain full locking to GPS satellite signals without having any other information about the system except the nominal carrier frequency and the rules by which data carried by the signals are modulated. Such a receiver measures ranging signals transmitted by a number of satellites (normally four). The signals include a so-called Coarse/Acquisition (C/A) code that is unique for each satellite and repeats itself every 1 ms. Superimposed on the C/A code is a navigation data bit stream with a bit period of 20 ms. The navigation data includes parameters that enable calculation of the satellite position at the time of transmission as well as parameters describing the offset of the satellite clocks. A stand-alone GPS receiver normally needs to decode the complete navigation data stream before the receiver location can be calculated. This may take quite a long time and requires a certain minimum signal strength. The receiver can determine the boundaries of the C/A code at a much lower signal strength than the one required to decode the navigation messages.

To facilitate positioning of GPS-equipped mobile terminals, with AGPS the navigation data is instead sent as assistance data on a faster and more reliable communication link, e.g. a wireless communication link between base station and mobile terminal. The assistance data typically also include an approximate GPS system time and an approximate location of the mobile terminal. (Depending on the mode of operation, the mobile terminal may instead receive a set of parameters that enables faster determining of the C/A code boundaries.)

There are two types of AGPS, mobile station based and mobile station assisted. In mobile station based AGPS, the location of a mobile station is calculated in the mobile station using ranging signal measurement results determined by the mobile station together with assistance data provided by the network. In mobile station assisted AGPS (sometimes called network based AGPS), the mobile station performs measurements of the received ranging signals and reports measurement results to a location server in the network (from which the mobile terminal also receives assistance data). Based on the reported measurement results and a priori information on where the mobile station is located, the location server calculates the location of the mobile station.

Well-known prior-art methods for calculating the location of GPS-equipped mobile terminals using mobile station assisted AGPS generally depend on reported measurement results comprising (truncated) pseudoranges to the satellites as well as the mobile terminal clock reading at signal reception time ($t_u$). However, there may be cases where $t_u$ is not reported at all or is reported erroneously. Although the mobile terminal according to the currently prevailing standard for AGPS has to report $t_u$, future standards may very well allow optional solutions.

There are alternative solutions, in which the time of transmission from the respective satellites ($t_{ti}$) is determined in several stages. First, the submillisecond part of $t_{ti}$ is determined by finding the boundaries of the C/A codes for each satellite, whereby correlators that test all possible code phase and Doppler shifts are used. Thereafter, the millisecond part of $t_{ti}$ is reconstructed. This normally requires that the received data is despread, leaving raw navigation databits. Reconstruction of TOW (Time of week) is then performed using one of several alternative techniques, for example Direct demodulation of TOW, TOW Reconstruction by correlation techniques or Real-time clocks. Whatever method is used, the mobile supporting mobile station assisted AGPS is subsequently required to compensate for the propagation delay and hence report the approximate GPS system time at time of measurement. The compensation can be done e.g. based on some information elements provided as assistance data.

The requirement to reconstruct the GPS network time of measurement implies that the positioning will at best work down to around −179 dBW. Another drawback is that this kind of reconstruction is rather time consuming. It will often take 8s until the necessary navigation data bits have been received.

U.S. Pat. No. 6,430,415 describes an approach for dealing with situations where the mobile terminal does not know the GPS network time. The approximate time of a satellite measurement is time stamped. The difference between true GPS network time and this measurement time is treated as an unknown in subsequent computations of the mobile terminal location. This requires one additional satellite measurement, i.e. five satellite measurements instead of the four used in conventional positioning methods.

The prior-art solutions for satellite-based positioning of mobile terminals are generally associated with limitations in performance or precision and/or require complicated calculations. There is a need for an improved positioning mechanism and in particular for an appropriate error correction in the positioning.

SUMMARY

A general object of the technology described herein is to improve the positioning of mobile terminals capable of receiving satellite signals. A specific object is to provide an error correction mechanism suitable for AGPS. Another object is to provide satellite-based positioning of mobile terminals with correction for errors due to estimations or reconstructions related to parameters measured at the mobile terminal. Still another object is to achieve satellite-based positioning of mobile terminals with efficient error correction in combination with a reasonable computational complexity.

Briefly, the technology described herein provides an improved procedure for locating (positioning) a mobile terminal, which receives signals from a plurality of satellites and measures pseudoranges to the satellites. The procedure involves correction for errors in time and/or pseudorange parameters measured at the mobile terminal (or errors in representations of such parameters). The main idea is to use the error correction only when needed, whereby the complexity of the process of calculating the position of the mobile terminal is reduced to a minimum while still achieving a satisfactory precision in the determined location. The location of the mobile terminal is first calculated based on the pseudoranges without error correction or with partial error correction. Thereafter, a quality measure associated with the location calculation is determined and this parameter estimate quality is compared to a predefined quality criterion, preferably based on the residual of a least squares solution for the mobile terminal location. The predefined quality criterion can for example be a predefined threshold value of a suitable quality parameter such as a minimum loss function. In case the predefined quality criterion is fulfilled, no further calculations are needed. Should, on the other hand, the quality of the first calculation be insufficient, the location of the mobile terminal is recalculated with added correction for errors in at least one time/pseudorange parameter measured at the mobile terminal (or a representation/reconstruction of such a parameter) and used for calculating its position.

When calculating (or recalculating) the location of the mobile terminal according to the technology described herein, a set of nonlinear equations is defined involving unknown parameters for the UE location and the UE clock bias. If correction for errors in a time parameter is included, there is an additional unknown parameter for the time offset (e.g. defined as the difference between the time of signal transmission from the respective satellites and the network time of the satellite-based positioning system). The nonlinear system of equations is linearized and then solved in a conventional manner, preferably in a weighted least squares sense.

In case at least one of the measured pseudoranges is a truncated pseudorange, the calculating procedure normally involves reconstructing a complete pseudorange from the truncated pseudorange based on a parameter for time of signal reception at the mobile terminal and an approximate mobile terminal location.

The proposed method can involve correction for errors in a parameter for time of signal reception, or correction for errors in at least one pseudorange parameter, or a combination of both. In particular advantageous embodiments the added error correction is introduced stepwise, to the extent deemed to be necessary based on the evaluation of two or more quality measures associated with the location calculations. According to an example embodiment with stepwise error correction, the positioning is first performed based on a time of signal reception reported by the mobile terminal in case such a parameter is available. If the quality of the result does not meet a first criterion, there is a new calculation which e.g. includes a transmission time offset estimation to correct for errors in the measured reception time. The quality is again checked, using a second criterion, and in case of insufficient quality the position is recalculated again, now with correction for pseudorange errors, possibly combined with transmission time offset estimation.

The technology described herein offers efficient positioning of mobile terminals with enhanced error correction and thus more accurate location calculations. A sophisticated solution is provided with quality checks that makes it possible to perform error correction only when needed. In this way, complex and time demanding computations can often be avoided, improving the overall system performance.

According to other aspects of the invention a mobile terminal, a positioning node and a communication system with means for satellite-based determining of mobile terminal locations are provided.

BRIEF DESCRIPTION OF THE DRAWINGS

The invention, together with further objects and advantages thereof, is best understood by reference to the following description and the accompanying drawings, in which.

DETAILED DESCRIPTION

A list of abbreviations follows at the end of this section.

In the detailed description below, embodiments implemented in a GPS system are illustrated. However, anyone skilled in the art realizes that the corresponding principles can be applied in any satellite based positioning system, such as the GLONASS or the coming European Galileo satellite navigation system.

Likewise, in the detailed description below, WCDMA systems will be used as model systems. However, the present invention is also applicable on other wireless communication systems. Non-exclusive examples of other systems on which the present invention is applicable are e.g. CDMA-2000 systems and GSM systems including GSM/GPRS systems. When applied to other wireless communication systems, the implementation of the different functionalities will be done in different terminals and nodes of such systems.

The term mobile terminal is in the present disclosure used to denote any kind of terminal that can be transported within a wireless communication system. Non-exclusive examples are cellular phones, personal digital assistants and portable computers.

Figure 1:
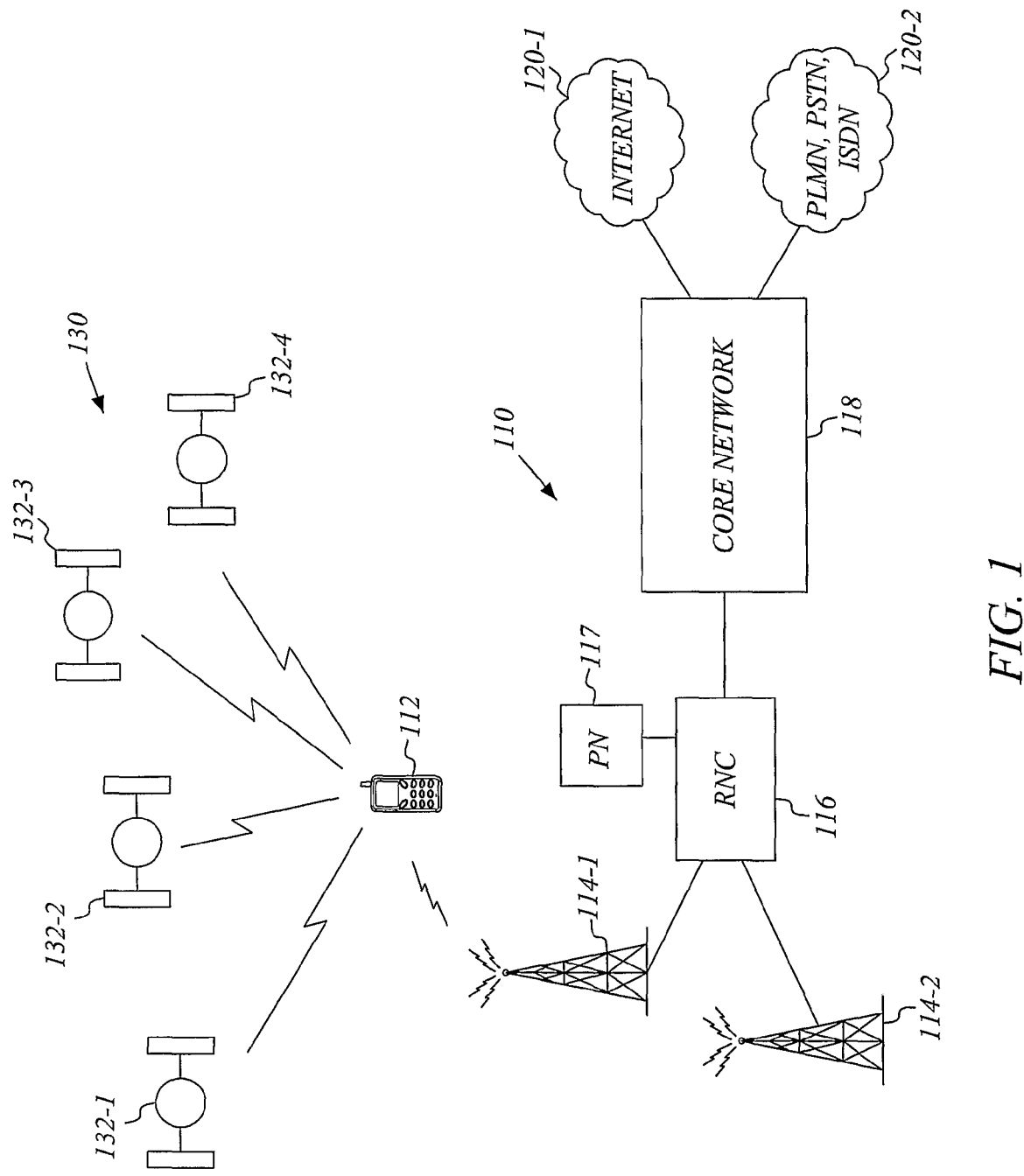
FIG. 1 is a schematic view of an example communication system in which the technology described herein may be used.

FIG. 1 is a schematic view of an example communication system in which the technology described herein may be used. In this example scenario a basic wireless communication system 110 is used together with the GPS system 130 to provide mobile station assisted AGPS.

The example wireless communication system 110 illustrated in FIG. 1 is a WCDMA system, comprising a radio access network (RAN), e.g. UTRAN, and a core network 118. The RAN performs radio-related functions and is responsible for establishing connections between user equipment/mobile terminals 112 and the rest of the network. The RAN typically contains a large number of Base Transceiver Stations (BTS) 114, also referred to as Node B, and Radio Network Controllers (RNC) 116. Each BTS serves the mobile terminals within its respective coverage area and several BTS are controlled by a RNC. Typical functions of the RNC are to assign frequencies, spreading or scrambling codes and channel power levels. The RNC 116 provides access to the core network 118, which e.g. comprises switching centers, support nodes and databases corresponding to those of a GSM/GPRS core network, and generally also includes multimedia processing equipment. The core network communicates with external networks 120, such as the Internet, and PSTNs, ISDNs and other PLMN.

In practice, most WCDMA networks, as well as most other wireless communication networks, present multiple network elements and nodes arranged in much more complex ways than in the basic example of FIG. 1.

In FIG. 1, the GPS system 130 is represented by space vehicles (SV), i.e. typically satellites 132. Each SV transmits a respective ranging signal, and by using a number of such ranging signals, the position of the mobile terminal 112 or of the person carrying the mobile terminal can be determined.

When a positioning request occurs, e.g. in the core network 118 of the wireless communication system 110, the positioning request is provided to a positioning node 117 associated with the RNC 116. The RNC 116 orders measurements of satellite ranging signals through control signals send to the mobile terminal 112. The measurement order is accompanied by assistance data. The assistance data comprises satellite position data and satellite time reference data and can for example be retrieved by the RNC 116 via a reference receiver (not shown) connected to the communication system 110. Such a reference receiver can be provided as one unit or divided in parts, separating the determination of the satellite time reference and the satellite position data. The assistance data is typically processed in the positioning node 117, which can e.g. determine which satellites that are in such positions that their ranging signals can be detected, before being sent to the mobile terminal 112.

The mobile terminal 112 is equipped with a receiver that is capable of detecting satellite ranging signals and the terminal 112 uses the assistance data to facilitate the locking on and measuring of the satellite ranging signals. The measured ranging signals are then used to calculate a position of the mobile terminal 112. If mobile station based AGPS is used, the processing of the ranging signals is performed in the mobile terminal. If mobile station assisted AGPS is used, the ranging signals or representations thereof are instead sent to a network node, typically the positioning node in the illustrated scenario, where the positioning calculations are performed based on the reported measurement results from the mobile terminal and on a priori information on where the mobile terminal is located. In the example of FIG. 1, the positioning functionality is provided in an external positioning node 117 connected to the RNC 116. The positioning node can for example be a stand-alone AGPS SMLC. Alternatively, the positioning functionality could be incorporated in the RNC 116 or in another network node.

Current GPS SVs transmit ranging signals with a spectrum centered at 1575.42 MHz. The signals include a C/A-code unique for each SV and which typically has a length of 1023 chips and a chip duration of $1/1.023 \times 10^6$ s. The C/A code repeats itself every 1 ms. Superimposed on the C/A code is a navigation data bit stream with a bit period of 20 ms. Among other things, the navigation data includes a set of ephemeris parameters that enables calculation of the precise position of the satellites at the time of signal transmission. The navigation data is divided into a number of subframes, each of length 6 seconds and each subframe is divided into 10 words. A time stamp, GPS Time Of Week (TOW), is transmitted in the second word (HOW) of every subframe. The indicated time is the time of transmission at the end of the subframe in question. The TOW is thus repeated every 6 seconds.

Each ranging signal basically defines a clock which is measured by the mobile station. The clock indicates the time of signal transmission. If the mobile station knows the GPS system time, then the clock reading can directly be used to determine the time delay, and hence the range from the SV transmitting the ranging signal to the mobile station. By measuring three ranges and utilizing the knowledge about Space Vehicle locations at time of transmission, the location of the mobile station can then be determined in three dimensions. However, normally the mobile station does not have knowledge about precise GPS system time, so one more measurement is needed to eliminate the mobile station clock bias.

Figure 2:
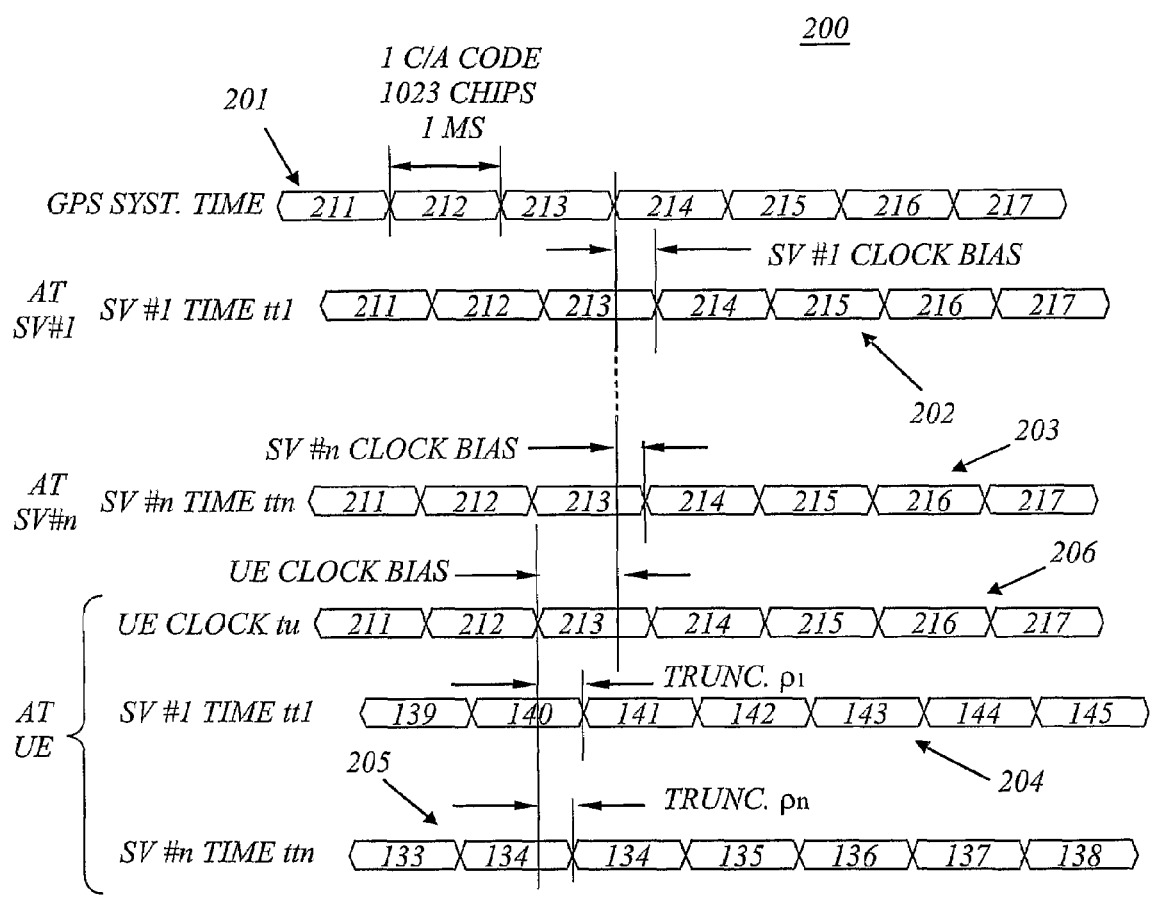
FIG. 2 is a timing diagram illustrating clock relations in an example communication system in which the technology described herein may be used.

FIG. 2 illustrate clock relations (expressed in milliseconds) for different parts of the system illustrated in FIG. 1. The SVs carry precise atomic clocks to maintain clock stability. The SV transmissions are however not perfectly synchronized to GPS system time as illustrated in the timing diagram 200. In FIG. 2, sequence 201 represents the GPS system time, sequence 202 represents the clock of SV1, sequence 203 represents the clock of SVN, sequence 206 represents the clock of the mobile terminal/UE while sequences 204 and 205, respectively, represent time as read in the ranging signals from SV1 and SVN, respectively, received by the mobile terminal. By drawing a vertical line through the timing diagram 200 a snapshot of all clock readings as observed in various points in space is obtained. GPS system time 201 is defined as an ensemble average based on a set of ground station clocks and a subset of SV clocks. The individual SV clocks 202, 203 and the UE clock 206 are slightly offset compared to the GPS system time. A model for the individual offsets is transmitted as part of the navigation message from each SV. When the signals reach a mobile terminal/UE on the earth surface, they have been delayed. The delay depends on the range from the SV in question to the UE but is typically 60-85 ms as illustrated by clock readings 204, 205.

A GPS receiver measures the pseudorange to a number of satellites. (Please note, however, that a GPS receiver integrated in a mobile terminal does not have to perform the complete calculations needed to determine the pseudoranges, and often only provides basic data needed to calculate/reconstruct pseudoranges). The pseudorange is $$\rho_i = c \cdot (t_u - t_{ti}) \quad (1)$$

where $t_u$ is the UE clock reading (206 in FIG. 2) at the time of signal reception, $t_{ti}$ is the time of signal transmission of the ith SV and c is the wave propagation speed. The pseudorange may differ from true range due to a number of perturbing factors, such as receiver clock bias, ionospheric and tropospheric delays, SV clock bias, measurement errors, etc. In this disclosure, the influence of most of these error sources will be neglected for the purpose of clarity. There are known prior-art techniques to compensate for many of the above listed error sources (see e.g. [1]). Furthermore the effect of SV movement and earth rotation is also omitted as it is also well known in the art how to handle these effects (see e.g. [1]). The simplified model is then that the measured pseudorange obeys $$\rho_i = |x_u(t_r) - x_{si}(t_{ti})| + b + e_i \quad (2)$$

Here, $x_u = (x_u \ y_u \ z_u)$ is a row vector containing the three-dimensional coordinates of the unknown receiver location at GPS system time $t_r$. Similarly $x_{si}$ is the row vector containing the coordinates of the ith SV at time of transmission $t_{ti}$. The notation $|z|$ means the norm of the vector quantity within brackets, which is equal to $(zz^T)^{1/2}$. In this case it can be interpreted as the distance between the receiver (mobile terminal) and the SV. b is the receiver clock bias (expressed as a range), $$b = c \cdot (t_u - t_{GPS}) \quad (3)$$

where $t_{GPS}$ stands for GPS system time, and $e_i$ is the measurement error.

The SVs normally move at a speed of 3.84 km/s and the transmission times therefore need to be known at the millisecond level unless the location accuracy is to be degraded. The transmission time $t_{ti}$ is typically determined in several stages. First the submillisecond part of $t_{ti}$ is determined by finding the boundaries of the C/A codes for each SV (see FIG. 2). This is done using correlators that test all possible code phase and Doppler shifts. In a subsequent step the millisecond part of the transmission time needs to be reconstructed. Normally, the received data is despread, leaving raw navigation databits, whereafter reconstruction of TOW can be made by a number of alternative techniques, such as Direct demodulation of TOW, Reconstruction by correlation techniques or Real-time clocks. Whatever method is used, the mobile supporting mobile station assisted AGPS is required to compensate for the propagation delay and hence report the approximate GPS system time at time of measurement. The compensation can be done e.g. based on information provided as assistance data.

As mentioned in the background section, the requirement to reconstruct the GPS network time of measurement implies that positioning will in the best case work down to around −179 dBW. Another drawback is that this kind of reconstruction is rather time consuming. It will often take 8s until the necessary navigation data bits have been received. Measurements of the C/A code shifts can be done at much lower signal strength, down to −185 dBW and therefore solutions that do not require that the TOW is reconstructed by the mobile terminal is desirable.

Moreover, for both types of AGPS the measured timing of the ranging signals is truncated modulo 1 ms, which corresponds to a distance of 300 km. When calculating the mobile terminal location, either in the mobile terminal itself or in a network location server, the complete pseudoranges need to be reconstructed using a priori information about the mobile station location together with the ranging signal measurement results determined by the mobile station, in order to compute the precise mobile terminal location. The pseudorange reconstruction is associated with a certain amount of uncertainty and may introduce an error in the calculated mobile terminal location.

Accordingly, the GPS-equipped mobile terminal performing satellite measurements for positioning purposes in an AGPS system normally does not have enough knowledge of the GPS network time of measurement and the pseudorange to the respective satellites to enable a satisfactory positioning of the mobile terminal. This has resulted in solutions dependent on reconstruction of time and pseudorange parameters and the reconstruction procedures introduce errors in the determined terminal location. No satisfactory error correction mechanism has been presented and, as explained in the background section, the prior-art solutions for satellite-based positioning of mobile terminals are generally associated with limitations in performance or precision and/or require complicated calculations.

The technology described herein provides an improved positioning mechanism with correction for errors in time and/or pseudorange parameters measured at the mobile terminal. The main idea is to basically use the error correction only when needed, whereby the complexity of the process of calculating the position of the mobile terminal can be reduced to a minimum while still achieving a satisfactory precision in the determined UE location parameters. For this, the technology described herein proposes to first calculate the location of the mobile terminal without error correction or with partial error correction, i.e. without using all parts of the complete error correction procedure. Thereafter, the quality of the results (i.e. of the used parameter estimates) is determined and compared to a predefined quality criterion e.g. a predefined threshold value of a suitable quality parameter. In case the predetermined quality criterion is fulfilled, no further calculations are needed. Should, on the other hand, the quality of the first calculation be insufficient, the location of the mobile terminal is recalculated, this time with added correction for errors in at least one of the parameters (time/pseudorange) measured at the mobile terminal and used for calculating its position.

By "added" error correction, it is to be understood that the recalculating step introduces at least one measure for error correction not present in the previous location calculation(s). In other words, the recalculating step involves a different kind of error correction introduced either as a first error correction measure or as a further error correction measure replacing or being combined with a previous partial error correction of the calculating step.

When calculating (or recalculating) the location of the mobile terminal according to the technology described herein, a nonlinear system of equations is defined involving unknown parameters for the UE location and the UE clock bias. In case correction for errors in time parameters is included, there is an additional unknown parameter for the transmission time offset. The latter implies that one additional satellite measurement, and thus one additional nonlinear equation, is required unless the dimensions of the determined UE location is to be reduced by one. The nonlinear system of equations is linearized and then solved in a conventional manner, preferably in a weighted least squares sense.

The error correction performed in accordance with the technology described herein (provided that the predefined quality criterion is not already fulfilled) can involve either correction for errors in a parameter for time of signal reception, or correction for errors in a pseudorange parameter (truncated or not), or a combination of both. Some preferred embodiments, described more in detail below with reference to FIGS. 3A and 3B, use a stepwise solution for error correction where comparisons with two or more predefined quality criteria may be performed at different stages of the process. The positioning is then first performed based on a time of signal reception at the mobile terminal, in case such a parameter is available. If the quality of the result does not meet a first criterion, there is a new calculation which for example may include a transmission time offset estimation, whereby the measured time of signal reception is not needed. The resulting quality is again checked, using a second criterion, and in case of insufficient quality the position is recalculated again, now with correction for pseudorange errors in addition to (or instead of) the transmission time offset estimation.

The technology described herein offers efficient positioning of mobile terminals with enhanced error correction and thus more accurate location calculations. When error correction methods are introduced this generally results in more time-demanding and complex calculations requiring more processing power, which is especially problematic in connection with AGPS. The invention recognizes this and provides a sophisticated solution with quality checks by means of which it is possible to perform error correction only when the quality really is bad. In this way, complex and time demanding computations can often be avoided, improving the overall system performance. Moreover, as will be evident in the following, the proposed quality checks enables for a minimum of additional satellite measurements in the error correction. The proposed solution is very favorable for AGPS which consistently seeks ways of simplifying the positioning of cellular phones and similar devices.

It follows from the above that the technology described herein basically involves three different types of location calculations, involving various degrees and kinds of error correction:

I) Location calculation using a measured/reported reception time
II) Location calculation using an estimated transmission time offset
III) Location calculation with pseudorange outlier correction The proposed procedure may use a subset or all of these calculation mechanisms performed separately or in combination in ways that will be exemplified in following. However, for a complete understanding of the technology described herein, the principles of each type of calculation will first be described by way of example.

Example Location Calculation (I) Using Measured/Reported $t_u$

This calculation mechanism may be used when the time of reception of the satellite signal at the mobile terminal, i.e. $t_u$, is available and is then performed either at the mobile terminal or in the network. The latter requires that the reception time is reported to the network by the mobile terminal that performs the satellite measurement.

In case the complete pseudorange is not known, it has to be reconstructed from the measured truncated pseudorange. For example, the mobile terminal often (e.g. in UE assisted AGPS) reports pseudoranges only modulo 1 C/A code period, i.e. the integer number of code periods in the pseudorange (Eq. (1)) is not known and has to be reconstructed. Let R in general represent the range corresponding to the truncation interval used when measuring ranging signal timing. As an example, the range R corresponding to a truncation interval of one C/A code period (1 ms) is then $$R = c \cdot 10^{-3} \quad (4)$$

We thus have that $$\rho_i = k_i R + v_i \quad (5)$$

where $v_i$ is the reported measurement that satisfies $0 \leq v_i < R$, and where the integer $k_i$ needs to be reconstructed. The reconstruction is done in the following way. Assume that an a priori location $x_{u0}$ of the UE is known as well as an approximate time $t_{u0}$.

First we determine the predicted pseudorange $$\rho_i' = |x_{si} - x_{u0}| \quad (6)$$

The SV locations $x_{si}$ may e.g. be calculated at a time $t_u$-77 ms. This is normally sufficient for the purpose of pseudorange reconstruction. By using Eq. (2) we can see that the reconstructed pseudorange according to Eq. (5) satisfies $$k_i R + v_i = |x_u - x_{si}| + b + e_i = \rho_i' + b + |x_u - x_{si}| - \rho_i' + e_i = \rho_i' + b + \Delta_i + e_i \quad (7)$$

where $k_i$ is an integer and $v_i$ satisfies $0 \leq v_i < R$, and where $\Delta_i = |x_u - x_{si}| - \rho_i'$ is the initial range uncertainty for SV#i. If $\Delta_i$, b and $e_i$ in Eq. (7) are small we may simply assume these terms are zero and determine the integer $k_i$ that best satisfies the resulting Eq. (7) for all i. This will eventually require a rounding operation. It is reasonable to assume that $\Delta_i$ and $e_i$ are small (compared to the quantization interval R), but the clock bias b in Eq. (7) could potentially be in the order of R, or even larger than R, which may lead to reconstruction errors. However, the essential issue for position calculation is that the relative pseudoranges (i.e. the differences $\rho_i - \rho_1$) are correctly reconstructed, since any common reconstruction error will be absorbed by the clock bias parameter b in the position calculation function. The difference $\rho_i - \rho_1$ between reconstructed pseudoranges satisfy $$k_i R + v_i - k_1 R + v_1 = \rho_i' + \Delta_i' + b + e_i - \rho_1' - \Delta_1' - b - e_1 = \rho_i' + \Delta_i' + e_i - \rho_1' - \Delta_1' - e_1 \quad (8)$$

for $i = 2, \ldots, n$, where n is the number of SVs. Note that the clock bias b has been eliminated from Eq. (8). Eq. (8) defines $n-1$ equations but there are n unknowns $k_i$. Therefore we will define $k_1$ using Eq. (7) instead, so that $$k_1 = \text{round}\{(\rho_1' - v_1)/R\} \quad (9)$$

Then we can insert $k_1$ in Eq. (8) and find that $$k_i = \text{round}\{(\rho_i' - \rho_1' - v_i + k_1 R - v_1)/R\} \quad (10)$$

The SV signal transmission times can now be estimated using the reconstructed pseudoranges of Eq. (7). From Eq. (1) we have that $$t_{ti} = t_u - \rho_i/c \quad (11)$$

Next we calculate the SV locations at that time. This can be done using standard formulae that can be found in [1]. The obtained coordinates needs to be compensated for the earth rotation during the time of transit. There are well-known formulae for this in [1]. The time of transit is approximately $\rho_i/c$. The obtained SV coordinates will generally be expressed in ECEF coordinates. However, for position calculation it is more convenient to use a local tangential coordinate system, e.g. when calculating accuracy measures like HDOP, or when only the horizontal coordinates is needed. The SV position coordinates are therefore transformed to a coordinate system centered at the approximate UE location, and where the unit vectors point towards east, north and up, respectively. It is well known in the art how to perform such a transformation.

Next we express the pseudorange measurement equation Eq. (2) in vectorized form as $$\rho = |1_n \cdot x_u - X_s| + b 1_n + e \quad (12)$$

Here, $\rho$ is a column vector of length n containing the reconstructed pseudoranges, $1_n$ is a column vector of length n containing only ones. $X_s$ is a matrix where the ith row contains the coordinates $x_{si}$ of the ith SV at the transmission time $t_{ti}$. It is assumed here that the norm $|Z|$ is calculated for each row of the matrix Z within brackets.

A Taylor series expansion around the initial estimate of the unknown parameters $x_u$ and b may be expressed as $$\rho = |1_n \cdot x_u - X_s| + b + e = |1_n \cdot x_{u0} - X_s| + b_0 1_n + G((x_u - x_{u0}) b)^T + v \quad (13)$$

where G is the geometry matrix which contains the derivatives of the pseudoranges with respect to the parameters $x_u$ and b, and v is the sum of the measurement error term e and the higher order Taylor series terms. Let $$r_i = |x_{u0} - x_{si}| \tag{14}$$

Then G is a matrix with the ith row being equal to $$G_i = [(x_{u0} - x_{si})/r_i (y_{u0} - y_{si})/r_i (z_{u0} - z_{si})/r_i 1] \tag{15}$$

The least squares solution to Eq. (13) is equal to $$(x_u b)^T = (x_{u0} b_0)^T + (G^T G)^{-1} G^T (\rho - |1_n \cdot x_{u0} - X_s| - b_0 1_n) \tag{16}$$

The minimum loss function value of this least squares solution is $$V = (\rho - |1_n \cdot x_{u0} - X_s| - b_0 1_n)^T (I - G(G^T G)^{-1} G^T)(\rho - |1_n \cdot x_{u0} - X_s| - b_0 1_n) \tag{17}$$

The minimum loss function value is a measure of how well the predicted pseudoranges based on an updated parameter estimate, match the measured pseudoranges. It can thus be used as an indication/measure of the quality of the parameter estimates and thereby as an indication of the quality of the location calculation.

The solution in Eq. (16) is a non-weighted least-squares solution, i.e. all measurements are given equal importance in the minimization procedure. However, if the pseudorange measurements have different accuracy it is generally better to put more weight on the accurate measurements. A weighted least-squares solution can be provided as follows. Let the covariance matrix of the pseudorange measurements be $$P = E\{ee^T\} \tag{18}$$

where $E\{\ \}$ is the expectation value of the quantity within brackets and e is the measurement error. Then, the weighted least squares solution to Eq. (13) is $$(x_u b)^T = (x_{u0} b_0)^T + (G^T P^{-1} G)^{-1} G^T P^{-1} (\rho - |1_n \cdot x_{u0} - X_s| - b_0 1_n) \tag{19}$$

In this case, the example quality criterion of the minimal loss function value becomes $$V = (\rho - |1_n \cdot x_{u0} - X_s| - b_0 1_n)^T (P^{-1} - P^{-1} G(G^T P^{-1} G)^{-1} G^T P^{-1})(\rho - |1_n \cdot x_{u0} - X_s| - b_0 1_n) \tag{20}$$

If the underlying assumption on the measurement errors is correct, then V will be distributed according to $\chi^2$-distribution with n-m degrees of freedom, where n is the number of pseudorange measurements and m is the number of estimated parameters. (In the described example using a measured/reported $t_u$, m=4 since $x_u$, $y_u$, $z_u$ and b are estimated.) This knowledge can be used for defining uncertainty measures as well as for testing the presence of outliers in the measurement data in accordance with a particular embodiment of the invention that will be described more in detail below.

Generally, it may be necessary to iterate the solution of Eq. (19) a few times, where each step uses a new G matrix based on the most recent parameter estimate, until the parameter vector has converged.

Example Location Calculation (II) Using Estimated τ

Now, we turn to the situation where the precise measurement time $t_u$ is not available for location calculations. This may be the case for example if, in UE assisted AGPS, the $t_u$ parameter has not been reported by the UE to the network. Alternatively, the UE may have chosen or been instructed not to use/measure $t_u$, e.g. if the measurement is assumed to be erroneous (have too low accuracy). In such cases, the technology described herein proposes a calculation mechanism which uses redundant measurements for estimating a constant offset τ in the assumed signal transmission times $t_{ti}$.

When the precise measurement time $t_u$ is not available, a transmission time $t_{ti}$ with sufficient accuracy cannot be reconstructed using Eq. (11). Instead we use a less accurate value of $t_u$ which may be erroneous with several seconds as an initial value. The pseudoranges that need to be reconstructed are then reconstructed using the reported truncated pseudoranges, an initial location $x_{u0}$ and the initial $t_u$, e.g. according to Eq. (4)-(7). Initial values for $t_{ti}$ can then be determined from Eq. (11).

The SV location at a nominal GPS time $t_{ti}$, can thereafter be determined using standard GPS formulae, see [1] for example. A differentiation of the SV location coordinates with respect to time, gives the three-dimensional velocity vector. The differentiation can be preformed in a conventional and straightforward manner. The obtained coordinates are expressed as ECEF coordinates. To simplify the subsequent position calculation, the location and the velocity vector are preferably converted to a local tangential coordinate system, as in the previous example location calculation. We thus obtain a linear model of the SV movement in a local tangential coordinate system $$x_{si}(t_{ti} + \tau) = x_{si}(t_{ti}) + v_{xsi}(t_{ti}) \cdot \tau \tag{21}$$

$$y_{si}(t_{ti} + \tau) = y_{si}(t_{ti}) + v_{ysi}(t_{ti}) \cdot \tau \tag{22}$$

$$z_{si}(t_{ti} + \tau) = z_{si}(t_{ti}) + v_{zsi}(t_{ti}) \cdot \tau \tag{23}$$

Next the measurement equation Eq. (2) is expressed in vectorized form as $$\rho = |1_n \cdot x_u - X_s(\tau)| + b + e \tag{24}$$

Here ρ is the column vector of length n containing the pseudoranges, $1_n$ is a column vector of length n containing only ones. $X_s(\tau)$ is a matrix where the ith row contains the coordinates $x_{si}$ of the ith SV at time $t_{ti} + \tau$. It is assumed here that the norm |Z| is calculated for each row of the matrix Z within brackets.

A Taylor series expansion of Eq. (24) around the initial estimates $x_{u0}$, $b_0$, $\tau_0$ of the unknown parameters $x_u$, τ and b may be expressed as $$\rho = |1_n \cdot x_u - X_s(\tau)| + b + e = |1_n \cdot x_{u0} - X_s(\tau_0)| + b_0 1_n + H \cdot ((x_u - x_{u0})\tau - \tau_0 b - b_0)^T + v \tag{25}$$

H is the geometry matrix which contains the derivatives of the pseudoranges with respect to the parameters $x_u$, τ and b. Let $$r_i = |x_{u0} - x_{si}(\tau_0)| \tag{26}$$

then H is a matrix with the ith row being equal to $$H_i = [(x_{u0} - x_{si}(\tau_0))/r_i (y_{u0} - y_{si}(\tau_0))/r_i (z_{u0} - z_{si}(\tau_0))/r_i \{v_{xsi}(\tau_0) \cdot (x_{u0} - x_{si}(\tau_0)) + v_{ysi}(\tau_0) \cdot (y_{u0} - y_{si}(\tau_0)) + v_{zsi}(\tau_0) \cdot (z_{u0} - z_{si}(\tau_0))\}/r_i 1] \tag{27}$$

The mobile terminal location is preferably provided using the weighted least squares solution to Eq. (24), which is $$(x_u \tau b)^T = (x_{u0} \tau_0 b_0)^T + (H^T P^{-1} H)^{-1} H^T P^{-1} (\rho - |1_n \cdot x_{u0} - X_s(\tau_0)| + b_0 1_n) \tag{28}$$

and a quality criterion in the form of the minimal loss function value becomes $$V = (\rho - |1_n \cdot x_{u0} - X_s(\tau_0)| + b_0 1_n)^T (P^{-1} - P^{-1} H(H^T P^{-1} H)^{-1} H^T P^{-1})(\rho - |1_n \cdot x_{u0} - X_s(\tau_0)| + b_0 1_n) \tag{29}$$

As before, the solution of Eq. (28) often need to be iterated until the parameter vector has converged.

Example Location Calculation (III) with Outlier Correction

It sometimes happen that the mobile terminal measures and/or reports pseudoranges with very large errors. Measurements associated with comparatively large errors are sometimes referred to as outliers, which is the term used herein to denote such erroneous values/parameters. The probability of outlier pseudoranges is especially high for AGPS modes of operation, since there normally is no validation of the estimated pseudorange in AGPS. Furthermore, the AGPS receiver typically measures the ranging signals at comparatively low signal levels, which increases the risk of choosing false correlation peaks. For these reasons, it is desirable for the AGPS position calculation function to be able to detect outliers in the received pseudorange measurements.

In accordance with a particular advantageous embodiment of the technology described herein, a mechanism for correction of positioning errors due to bad reported/measured pseudoranges is provided. The proposed scheme for detecting outliers is based on a measure of the parameter estimate quality, such as the loss function value V of Eq. (29) or Eq. (20) whichever is relevant. The parameter estimate quality is checked against a suitable quality criterion (e.g. a threshold for the parameter estimate quality measure) to see if there are any outlier pseudoranges.

In the example with the loss function value as quality measure, the quality criterion can with advantage be determined based on knowledge about how the loss function should be distributed in the ideal case. As mentioned above, ideally V is distributed according to $\chi^2$-distribution with n-m degrees of freedom, where n is the number of pseudorange measurements and m is the number of estimated parameters. (In the example of Eq. (20), m=4, whereas, m=5 in the example of Eq. (29) due to the additional parameter $\tau$.) A threshold related to this distribution is chosen based on the desired probability of false alarm. If the reported value of $V > V_{thr}$, i.e. the parameter estimate quality is too low, it is concluded that at least one outlier is present in the set of pseudorange measurements that was used in the location calculation.

The outlier detection and correction in accordance with the technology described herein can for instance involve an iterative calculation procedure, in which the location calculation is repeated n times, n being the number of pseudorange measurements, and where in the kth repetition the kth pseudorange is being omitted from the position calculation. The quality of all n obtained solutions is evaluated and, assuming that the best quality was achieved for the kth repetition and that the resulting quality is deemed to be acceptable, it is concluded that the kth measurement was faulty. The final location returned to the node making the positioning request is determined based on the position calculation with the kth measurement being omitted.

By means of outlier correction, the accuracy of the mobile terminal positioning can be considerably increased. Since, the outlier rejection normally involves a number of additional calculations of the location, for example according to Eq. (28), the real benefit of this procedure is accomplished by combining outlier pseudorange correction with the described quality checks. The additional computations are thereby restricted to the cases where outlier correction is needed determined based on a preset quality criterion.

Figure 3A:
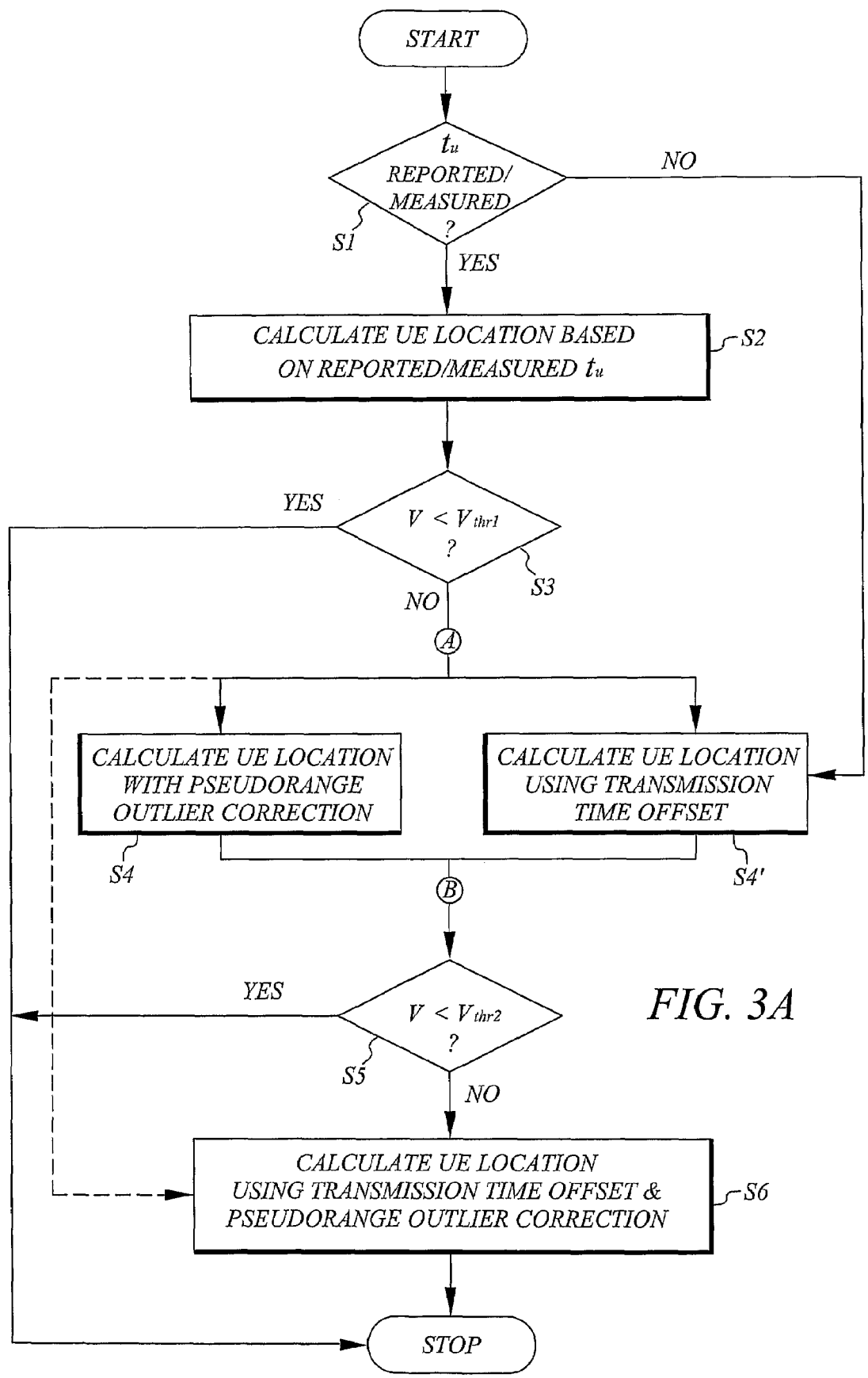
FIGS. 3A and 3B are flow charts of methods for determining the location of a mobile terminal in a wireless communication network according to example embodiments of the technology described herein.

FIG. 3A is a flow chart of a method for determining the location of a mobile terminal in a wireless communication network according to an example embodiment of the technology described herein. This example position calculation accounts for both the risk of erroneous reception time $t_u$ and the risk of outlier pseudoranges $\rho$, preferably in a stepwise procedure. The procedure initially takes two different paths depending on whether the time $t_u$ of reception of the respective satellite signals measured at the mobile terminal is available for use in the location calculations or not. In a network-based scenario (mobile station assisted AGPS), this means that the procedure in step S1 asks if $t_u$ has been reported by the mobile terminal to the network or not. In a scenario where the position calculation is performed at the mobile terminal (mobile station based AGPS), the reception time $t_u$ is always available for measurements at the mobile terminal. Nevertheless, there may be cases where the mobile terminal chooses not to measure/use $t_u$ and this is handled by step S1.

Accordingly, step S1 checks if $t_u$ is reported by the mobile terminal (mobile station assisted AGPS) or measured at the mobile terminal (mobile station based AGPS). If no, the position of the mobile terminal is immediately calculated with transmission time offset estimation in accordance with step S4'. However, if $t_u$ is available, the location is first calculated in accordance with step S2 using the reported/measured $t_u$, for example as outlined by Eq. (19) above. In step S3, the quality of the result of step S2 is checked against a predetermined quality criterion, here exemplified by a loss function criterion. The loss function value V for the terminal location from step S2 is then determined and compared to a predetermined threshold value $V_{thr1}$. If the predetermined quality criterion is fulfilled, e.g. the resulting loss function value V is smaller than the threshold $V_{thr1}$, the mobile terminal location from step S2 becomes the final location and no further error control is needed. The location will typically be reported along with an uncertainty area. If, on the other hand, the resulting loss function is larger than the predefined threshold, this implies that either the reported $t_u$ is erroneous or that there is an outlier in the pseudorange $\rho$ measurements or both. The procedure then continues with recalculating the mobile terminal location with added error correction e.g. in the form of pseudorange outlier correction (step S4) or, alternatively, transmission time offset $\tau$ estimation (step S4'). For example step S4' can be performed as outlined by Eq. (28) above, whereas step S4 can use an iterative calculation procedure for pseudorange outlier correction described in connection with FIG. 4 with the location computed using $t_u$.

In step S5, the quality of the terminal location calculated/recalculated in step S4 or S4' is determined and checked against a predetermined quality criterion, here exemplified as another maximum threshold $V_{thr2}$ for the loss function. If the parameter estimate quality is smaller than $V_{thr2}$ the obtained location can be reported along with an uncertainty area and the procedure is terminated after step S5. Otherwise, if the loss function is larger than the predefined threshold, it is assumed that there are still errors in the measured time or pseudorange parameters that need to be taken care of. In that case, the mobile terminal location is recalculated in step S6 using the transmission time offset parameter (to account for errors in $t_u$) in combination with correction for outliers in the pseudorange data. The location calculation of step S6 can for example comprise an iterative calculation procedure for pseudorange outlier correction such as the example in FIG. 4 with the location computed using $\tau$.

An alternative to the above-described procedure would be to go directly to step S6 if the quality criterion of step S3 is not fulfilled. This is indicated by the dashed arrow in FIG. 3A. Although it is quite possible to perform both types of error correction in combination as soon as it is discovered that the quality of the location calculation is insufficient, such an embodiment would generally be associated with an increased computational burden associated with the location calculations, requiring more satellite measurements than the respective calculations of step S4, S4'. Hence, it would normally be preferred to introduce the error correction stepwise as described above.

Figure 3B:
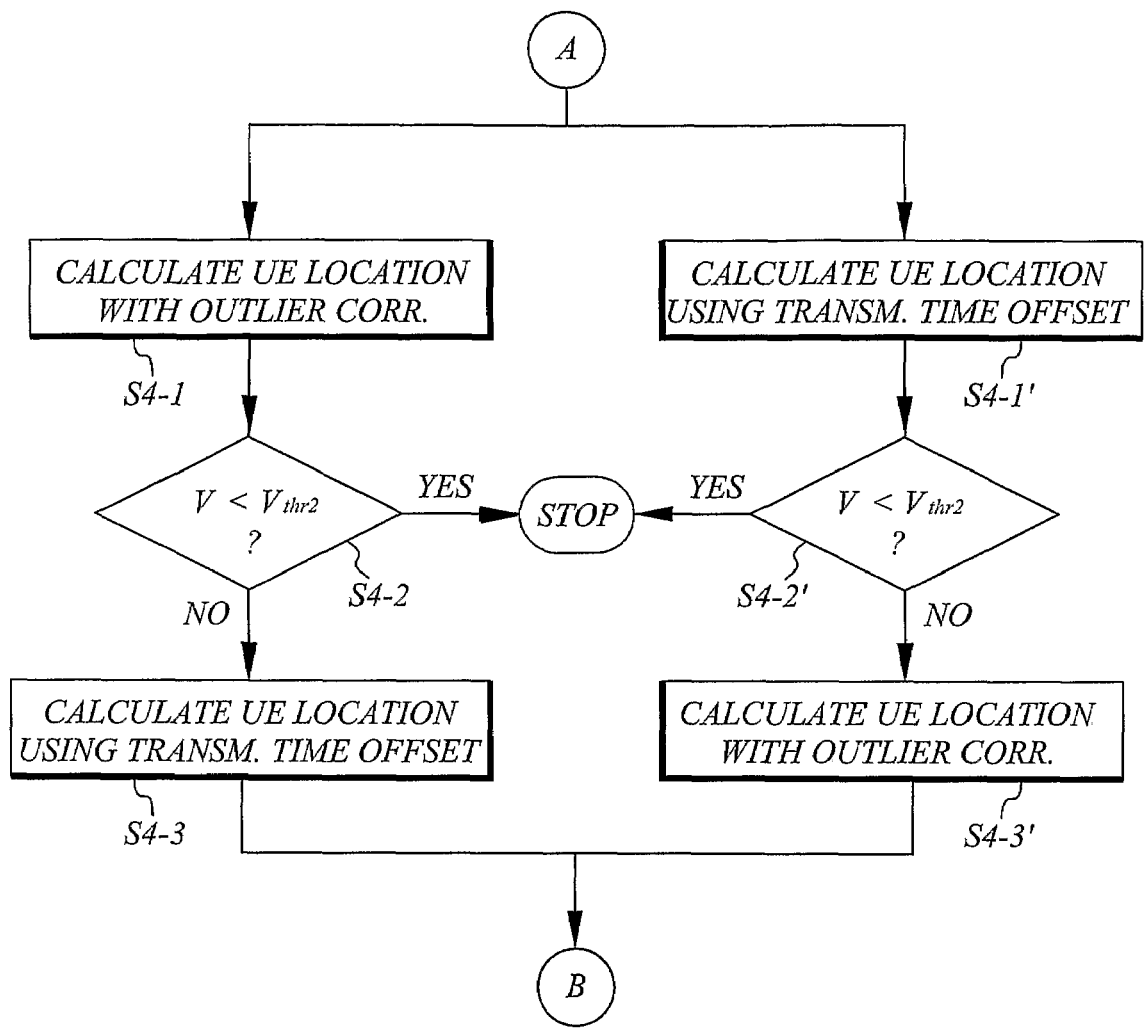

Moreover, in accordance with particular advantageous embodiments of the technology described herein it is proposed to divide the error correction into further substeps, as illustrated by the flow chart of FIG. 3B, which can be seen as an alternative sub-procedure to be inserted between points A and B in FIG. 3A. Steps S4-1 and S4-1', respectively, correspond directly to steps S4 and S4', respectively (FIG. 3A). However, in case the subsequent quality check (step S4-2/S4-2') reveals that the quality is insufficient, the location is recalculated (step S4-3/S4-3') again using the other error correction type, i.e. transmission time offset estimation in case pseudorange outlier correction (with $t_u$) was used first, and vice versa. In accordance with these embodiments, the combined error correction of step S6 (FIG. 3A) will be used only in case none of the separate mechanisms with correction for errors in $t_u$ or pseudorange outliers is capable of achieving sufficient quality alone. In such cases, there will be a comparison with a third quality criterion, which may equal the second criterion as the illustrated $V_{thr2}$ or be different, followed by a third recalculation provided that the criterion is not fulfilled.

It should be noted that the outlier correction steps S4-1, S4-3' are performed using $t_u$ and the embodiments of FIG. 3B are therefore applicable only in cases where $t_u$ is available (reported/measured), i.e. in scenarios corresponding to the "yes-path" from step S1 (FIG. 3A).

Figure 4:
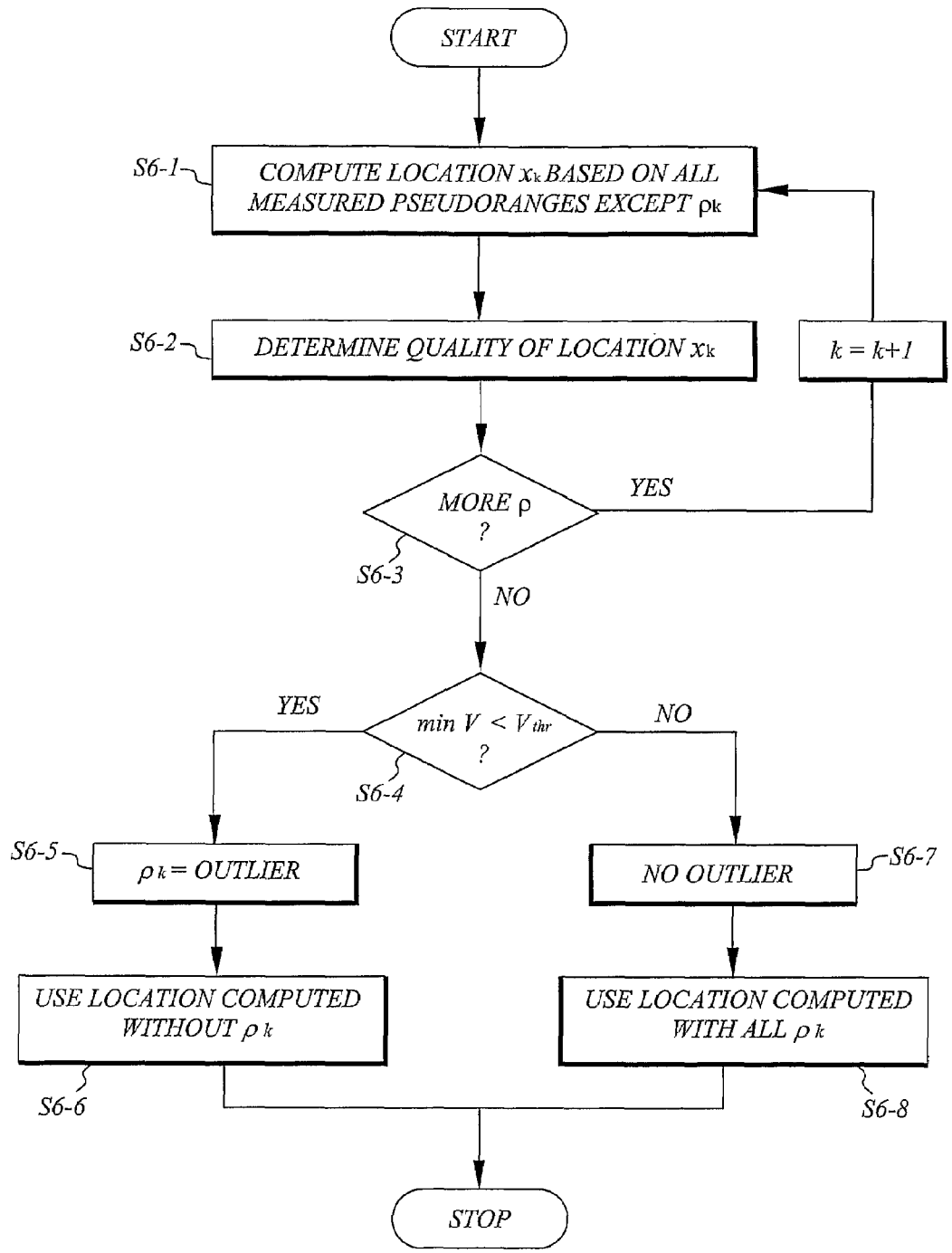
FIG. 4 is a flow chart of an iterative calculation procedure for pseudorange outlier correction used in an example embodiment of the technology described herein.

The location calculations in accordance with the technology described herein that involve pseudorange outlier correction (step S4, S6 of FIG. 3A and step S4-1, S4-3' of FIG. 4B) can for example comprise an iterative calculation procedure such as the example procedure of FIG. 4. The outlier correction involves n cases with computation of the mobile terminal location $x_k$ (k=1, 2, . . . , n), n being the number of pseudorange measurements available (step S6-1). The computations of step S6-1 are performed such that in the kth case, the kth pseudorange measurement is excluded from the position calculation. This position calculation function either uses $t_u$, e.g. according to Eq. (19), or includes estimation also of the transmission time offset τ, i.e. involves a combination of correction for errors in the measured/reconstructed $t_u$ and ρ, e.g. using Eq. (28). In step S6-2, the parameter estimate quality is determined for the computed location $x_k$. Step S6-3 asks if there are more pseudorange parameters available. If so, k is increased by one and steps S6-1 and S6-2 are repeated for the next pseudorange. If all available pseudoranges have been used (k=n), the procedure continues with evaluation of the determined parameter estimate qualities (steps S6-4, S6-5, S6-7). A comparatively high quality is hereby interpreted as an indication that the omitted pseudorange is an outlier. If an outlier pseudorange is detected, this pseudorange is removed from the set of measurements and is not included in the determination of the final terminal location. In the example with loss function thresholds, the outcome of the n computations is n loss function values $V_k$. If the smallest loss function value minV among these n loss function values is smaller than a threshold $V_{thr}$, it is concluded that an outlier has been successfully detected and removed (S6-5, S6-6). Otherwise it is concluded that no outlier could be removed, whereby the location computed with all available pseudoranges will typically be used (S6-7, S6-8). The procedure is terminated and the obtained location is preferably reported along with an uncertainty area.

The stepwise introduced error correction of FIG. 3A (and FIG. 3B) is very advantageous since it provides more accurate positioning while maintaining the computations at an acceptable complexity with a minimum of increases on the computational and measurement burden. The additional calculations associated with the iterative outlier rejection procedure can for instance be limited to cases where the possibility that the bad result was due to an erroneous reception time has already been checked and ruled out.

As mentioned in the background section, U.S. Pat. No. 6,430,415 describes an approach for dealing with situations where the mobile terminal does not know the GPS network time by using the difference between true GPS network time and approximate time a satellite measurement as an additional unknown in computations of the mobile terminal location. This requires one additional satellite measurement and results in demanding calculations with regard to processing time and power. In accordance with U.S. Pat. No. 6,430,415, this kind of extended processing would always be used, imposing heavy demands on the positioning functionality in the mobile terminal and/or cellular network. The technology described herein recognizes that a more appropriate positioning functionality can be achieved by introducing quality checks in the location calculations. The proposed solution distinguishes between different error correction needs and applies different degrees of error correction/parameter estimation depending on the situation. Therefore, a minimum of additional complexity is introduced in the calculations while obtaining an sufficient precision in the positioning. The quality checks of the technology described herein also makes it possible to improve the positioning further by including functionality correcting for outliers in the pseudorange measurements.

Although implementing the technology described herein in accordance with FIG. 3A (and FIG. 3B) is very favorable, the skilled person recognizes that still other flow sequences are possible as well. The respective steps with outlier correction and transmission time offset estimation can for example be performed in parallel. Furthermore, the quality criteria in step S3 and S5 (and S4-2, S4-2') as well as in the S6 procedure may be equal ($V_{thr1}=V_{thr2}$) or different ($V_{thr1} \neq V_{thr2}$), fixed or varying. In the example with loss functions, it will generally be appropriate to use different quality criteria at least for calculations associated with different degrees of freedom.

The outlier correction can also be subject to various modifications. One alternative would be to continuously evaluate the results of the location calculations with one measurement omitted and only continue the iterative procedure until a predetermined quality criterion is met. The iterative loop of FIG. 4 would then include also the evaluating steps S6-4, S6-5, S6-7. Other embodiments may continue even after the criterion is fulfilled, and improve the quality further is if possible. The outlier correction may be restricted to removal of one measurement or may allow more than one outlier pseudorange to be removed in case there are enough satellite measurements.

In some cases there may not be sufficient pseudorange measurements to perform all the tests that would be required in preferred embodiments of the present invention, for example in accordance with step S6 of FIG. 3A. It may then be appropriate to reduce the location parameter space to a 2-dimensional location (the x and y coordinates in an earth-tangential coordinate system) in order to be able to maintain integrity, handle missing measurements of $t_u$, and to provide a reliable estimate of the uncertainty area. When estimations of the transmission time offset is included in the calculation of the mobile terminal location, five satellite measurements are typically required for the terminal to be determined in three dimensions. (and additional error correction for outliers requires still more measurements). With a 2-dimensional fix, i.e. by omitting the vertical z coordinate, which typically is subject only to small variations, four satellite measurements will be sufficient even when corrections for errors in the measured $t_u$ is needed.

Figure 5:
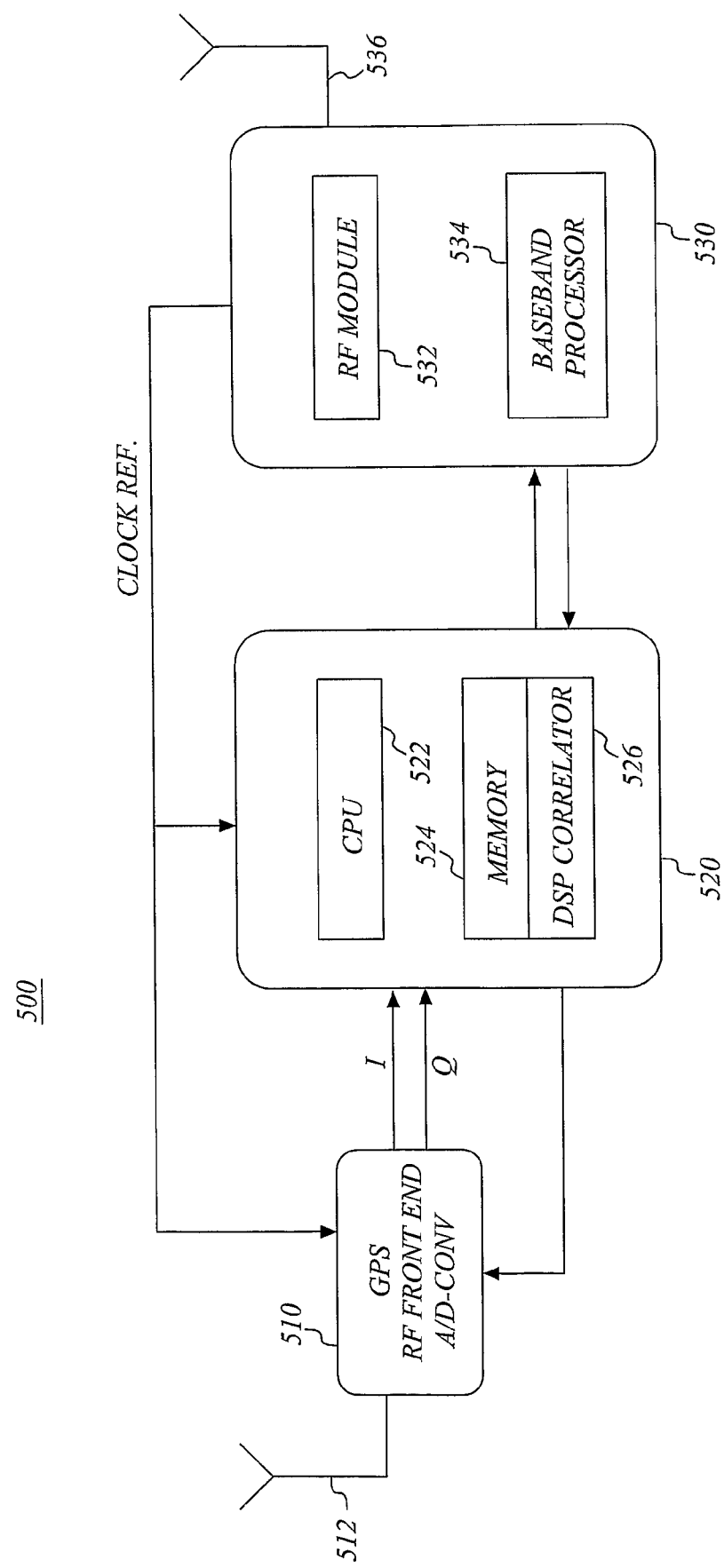
FIG. 5 is a schematic block diagram of a mobile terminal in accordance with an example embodiment of the technology described herein.

FIG. 5 is a schematic block diagram illustrating an exemplary hardware implementation of a mobile terminal in accordance with the technology described herein. The mobile terminal 500 comprises a GPS RF front end 510, a positioning module/processor 520, a cellular communication module 530 (with a cellular RF module 532 and a cellular baseband processor 534), as well as antennas 512, 536 for communication with the cellular network and the GPS system, respectively. The cellular communication module 530 receives assistance data from the cellular network. The assistance data could comprise ephemeris and clock corrections for visible satellites, an approximate UE location and an approximate GPS system time. Alternatively, the assistance data could contain explicit assistance intended only for assisting the correlation processing. The assistance data is in both cases sent to the positioning module 520. The communication module 530 also provides the GPS RF front end 510 and the positioning module 520 with a clock reference. The RF front end module 510 is controlled by the positioning module 520.

When the positioning module 520 receives a positioning request from the communication module 530, it instructs the RF front end module 510 to collect GPS signal samples. The GPS RF front end 510 receives the GPS frequency band through the antenna 512, downconverts the signal to baseband, separates the signal into in-phase (I) and quadrature (Q) components, samples and converts the signals into digital format, and outputs these to the positioning module 520 through the I/Q interface. The positioning module stores the received I and Q data in memory 524 and after enough data has been collected, correlation operators take place within the DSP 526. The correlators are controlled by the CPU 522, which in turn uses the assistance data for reducing the amount of correlations needed. When enough C/A code boundaries have been detected, or a timer has elapsed, the positioning module 520 outputs the measured truncated pseudoranges to the communication module 530 that sends the measurements to the cellular network for position calculation (mobile station assisted AGPS). Alternatively, the position may be calculated in the CPU 522 using available ephemeris and clock correction parameters, approximate GPS system time and the approximate location of the UE (mobile station based AGPS).

As for the positioning functionality in the cellular network, there is preferably a positioning node (117 in FIG. 1) associated with the RNC (or with network functionality corresponding to RNC for non-WCDMA systems). The positioning node can be an external node connected to the RNC or incorporated in the RNC node. The positioning node is preferably adapted for receiving positioning requests and may be involved in the ordering of satellite measurements from the mobile terminal. Such a measurement order is accompanied by assistance data, generally processed in the positioning node.

For mobile station assisted AGPS, the positioning node preferably also comprises means for receiving ranging signals originating from a mobile terminal (or representations thereof) and processing means for calculating the location of the mobile terminal based on the reported measurement results from the mobile terminal and on a priori information about the mobile terminal location. Embodiments where at least some of the network functionality for positioning are distributed onto separate physical network nodes also lie within the scope of the invention. There may for example be separate processing means for processing the assistance data and for calculating the mobile terminal location, respectively.

The predetermined quality criterion used in accordance with the technology described herein to determine whether further error correction should be applied, has mainly been exemplified as a threshold value of the minimum loss function. Other embodiments may use other quality criteria than the minimum loss function. The quality criterion is preferably related to the residual of a least squares solution providing the mobile terminal location, e.g. based on the residual variance/covariance, but other criteria can be used. Basically, any suitable measure of the match between predicted and measured parameters (e.g. time or pseudorange parameters) affecting the location calculations can be used.

Moreover, the quality criterion does not necessarily have to be expressed as a constant threshold value but may be varying, for instance depending on previous results in the location calculating procedure or on factors directly or indirectly influencing the required accuracy of the determined location/position. When deciding upon a suitable quality criterion there is a tradeoff between accuracy in the positioning and the degree of computational complexity and often simple thresholds will be the most appropriate choice.

Although the technology described herein has been described with reference to specific illustrated embodiments, it should be emphasized that it also covers equivalents to the disclosed features, as well as modifications and variants obvious to a man skilled in the art. Thus, the scope of the invention is only limited by the enclosed claims.

ABBREVIATIONS

AGPS Assisted Global Positioning System
C/A Coarse/Acquisition
CPU Central Processing Unit
DSP Digital Signal Processor
ECEF Earth-Centered Earth-Fixed
GPRS General Packet Radio Service
GPS Global Positioning System
GSM Global System for Mobile communication
HDOP Horizontal Dilution Of Precision
HOW Hand-Over Word
ISDN Integrated Services Digital Network
MS Mobile Station
PLMN Public Land Mobile Network
PSTN Public Switched Telephone Network
RAN Radio Access Network
RF Radio Frequency
SMLC Serving Mobile Location Center
SV Space Vehicle
TOW Time Of Week
UE User Equipment
UTRAN Universal Terrestrial Radio Access Network

REFERENCES

[1] Navstar GPS Space Segment/Navigation user Interfaces, ICD-GPS-200, Revision IRN-200C-003, 11 Oct. 1999.
[2] 3GPP TS 44.031, v 5.6.0

The invention claimed is:

1. A method for determining a location of a mobile terminal in a cellular communication network, the mobile terminal being configured to receive signals from satellites of a satellite-based positioning system, the method comprising:
receiving, at the mobile terminal, signals from a plurality of satellites;
measuring, at the mobile terminal, pseudoranges to the satellites at a time of signal reception;

calculating the location of the mobile terminal based on parameters representing the measured pseudoranges;

determining a quality measure associated with the location calculation;

comparing the determined quality measure to a first predefined quality criterion; and recalculating, if the quality measure does not fulfill the first predefined quality criterion, the location of the mobile terminal with added correction for error in at least one parameter representing a parameter measured at the mobile terminal, wherein said calculating step uses a parameter for the time of signal reception measured at the mobile terminal, and said recalculating step involves correction for error in the parameter for the time of signal reception by using a transmission time offset parameter as an additional unknown parameter.

2. The method of claim 1, further comprising:

determining a quality measure associated with the location recalculation of said recalculating step;

comparing the determined quality measure of the recalculation with a second predefined quality criterion; and performing, if the quality measure does not fulfill the second predefined quality criterion, a second recalculation of the location of the mobile terminal in an iterative calculation procedure for pseudorange outlier correction.

3. The method of claim 1, further comprising:

determining a quality measure associated with the location recalculation with a second predefined quality criterion; and performing, if the quality measure does not fulfill the second predefined quality criterion, a second recalculation of the location of the mobile terminal with correction for error in the time of signal reception by using a transmission time offset parameter as an additional unknown parameter.

4. The method of claim 2, further comprising:

determining a quality measure associated with the second recalculation;

comparing the determined quality measure of the second recalculation with a third predefined quality criterion; and performing, if the quality measure does not fulfill the third predefined quality criterion, a third recalculation of the location of the mobile terminal with the correction using the transmission time offset parameter as the additional unknown parameter in combination with the correction for error through the iterative calculation procedure for pseudorange outlier correction.

5. The method of claim 2, wherein said iterative calculation procedure for pseudorange outlier correction involves location computations using the transmission time offset parameter as the additional unknown parameter for correction for error in the parameter representing the time of signal reception.

6. The method of claim 1, wherein said calculating step uses the transmission time offset parameter as the additional unknown parameter and said recalculating step involves correction for error in at least one representative of the pseudoranges measured at the mobile terminal using the transmission time offset parameter in an iterative calculation procedure for pseudorange outlier correction.

7. The method of any of claim 2, wherein the iterative calculation procedure for pseudorange outlier correction comprises:

computing the location of the mobile terminal repeatedly, omitting one pseudorange measurement at a time;

determining a quality measure associated with each computed location;

evaluating the determined quality measures, whereby a comparatively high quality is an indication that the omitted pseudorange is an outlier; and removing, if an outlier pseudorange was detected in the evaluating step, the outlier pseudorange and using the location computed with the outlier pseudorange omitted as the mobile terminal location.

8. The method of claim 1, wherein the transmission time offset parameter represents a time difference between the time of signal transmission from the respective satellites and the network time of the satellite-based positioning system.

9. The method of claim 1, wherein the quality measure is a measure of the parameter estimate quality determined using the residual of a least squares solution for the mobile terminal location.

10. The method of claim 1, further comprising the step of reconstructing, in case at least one of the measured pseudoranges is a truncated pseudorange, a complete pseudorange from the truncated pseudorange based on the time of signal reception at the mobile terminal and an approximate mobile terminal location.

11. The method of claim 1, wherein the respective steps of calculating and recalculating in turn comprises:

defining a nonlinear equation system with unknown parameters at least for the mobile terminal location and a mobile terminal clock bias;

linearizing the equation system such that the satellite motion is modeled as linear with a nominal satellite position and a velocity vector; and solving the equation system for the mobile terminal location.

12. The method of claim 11, comprising:

determining the nominal position for the respective satellites using a time of satellite transmission determined based on the measured pseudorange and the time of signal reception at the mobile terminal; and expressing the satellite position in a local tangential coordinate system with two horizontal and one vertical coordinate.

13. A mobile terminal in a cellular communication network, the mobile terminal comprising:

means for receiving signals from a plurality of satellites of a satellite-based positioning system;

means for measuring pseudoranges to the satellites at a time of signal reception;

means for calculating a location of the mobile terminal based on parameters representing the measured pseudoranges;

means for determining a quality measure associated with the location calculation;

means for comparing the determined quality measure to a first predefined quality criterion; and means for recalculating, if the quality measure does not fulfill the first predefined quality criterion, the location of the mobile terminal with added correction for error in at least one parameter representing a parameter measured at the mobile terminal, wherein said means for calculating is adapted for using a parameter for the time of signal reception measured at the mobile terminal and said means for recalculating involves means for correction for error in the parameter for the time of signal reception through a transmission time offset parameter as an additional unknown parameter.

14. The mobile terminal of claim 13, further comprising:
means for determining a quality measure associated with the location recalculation; and
means for a second recalculation, if the quality measure does not fulfill a second predefined quality criterion, of the location of the mobile terminal involving means for iterative pseudorange outlier correction.

15. The mobile terminal of claim 14, further comprising:
means for determining a quality measure associated with the second recalculation;
means for comparing the determined quality measure of the second recalculation with a third predefined quality criterion; and
means for a third recalculation of the location of the mobile terminal, in case the quality measure does not fulfill the third predefined quality criterion,
said third recalculation comprising the correction for error through the transmission time offset parameter in combination with the iterative pseudorange outlier correction.

16. The mobile terminal of claim 14, wherein said iterative pseudorange outlier correction involves means for location computations with the transmission time offset parameter as the additional unknown parameter.

17. The mobile terminal of claim 13, wherein said means for calculating is adapted for using the transmission time offset parameter as the additional unknown parameter and said means for recalculating involves means for correction for error in at least one representative of the pseudoranges measured at the mobile terminal using the transmission time offset parameter in iterative pseudorange outlier correction.

18. The mobile terminal of claim 14, comprising means for iterative calculation with pseudorange outlier correction comprising;
means for repeatedly computing the location of the mobile terminal, omitting one pseudorange measurement at a time;
means for determining a quality measure for each computed location;
means for evaluating the determined quality measures, whereby a comparatively high quality is an indication that the omitted pseudorange is an outlier; and
means for removing, if an outlier pseudorange was detected by said evaluating means, the outlier pseudorange, whereby the location computed with the outlier pseudorange omitted is used as the mobile terminal location.

19. The mobile terminal of claim 13, wherein the quality measure is based on the residual of a least squares solution for the mobile terminal location.

20. The mobile terminal of claim 13, further comprising means for reconstructing a complete pseudorange from a measured truncated pseudorange based the time of signal reception at the mobile terminal and an approximate mobile terminal location.

21. A positioning node in a cellular communication network with means for determining a location of a mobile terminal in the cellular communication network, the mobile terminal arranged with means for receiving signals from satellites of a satellite-based positioning system, the node comprising:
means for receiving, from the mobile terminal, parameters relating to measured pseudoranges to a plurality of satellites, the pseudoranges relating to a time of measurement;
means for calculating the location of the mobile terminal based on parameters representing the measured pseudoranges;
means for determining a quality measure associated with the location calculation;
means for comparing the determined quality measure to a first predefined quality criterion; and
means for recalculating, if the quality measure does not fulfill the first predefined quality criterion, the location of the mobile terminal with added correction for error in at least one parameter representing a parameter measured at the mobile terminal, wherein
said means for calculating is adapted for using a parameter for the time of signal reception reported by the mobile terminal and said means for recalculating involves means for correction for error in the parameter for the time of signal reception through a transmission time offset parameter as an additional unknown parameter.

22. The positioning node of claim 21, further comprising;
means for determining a quality measure associated with the location recalculation;
means for comparing the determined quality measure of the recalculation with a second predefined quality criterion; and
means for a second recalculation, if the quality measure does not fulfill the second predefined quality criterion, of the location of the mobile terminal involving means for iterative pseudorange outlier correction.

23. The positioning node of claim 22, further comprising:
means for determining a quality measure associated with the second recalculation;
means for comparing the determined quality measure of the second recalculation with a third predefined quality criterion; and
means for a third recalculation of the location of the mobile terminal, in case the quality measure does not fulfill the third predefined quality criterion, said third recalculation comprising the correction through the transmission time offset parameter in combination with the iterative pseudorange outlier correction.

24. The positioning node of claim 22, wherein said iterative pseudorange outlier correction involves means for location computation with the transmission time offset parameter as the additional unknown parameter.

25. The positioning node of claim 21, wherein said means for calculating is adapted for using the transmission time offset parameter and said means for recalculating involves means for correction for error in at least one representative of the pseudoranges measured at the mobile terminal using the transmission time offset parameter in iterative pseudorange outlier correction.

26. The positioning node of claim 22, comprising means for iterative calculation with pseudorange outlier correction that in turn includes:
means for repeatedly computing the location of the mobile terminal, omitting one pseudorange measurement at a time;
means for determining a quality measure for each computed location;
means for evaluating the determined quality measures, whereby a comparatively high quality is an indication that the omitted pseudorange is an outlier; and
means for removing, if an outlier pseudorange was detected by said evaluating means, the outlier pseudorange, whereby the location computed with the outlier pseudorange omitted is used as the mobile terminal location.

27. The position node of claim 22, wherein the quality measure is based on the residual of at least squares solution for the mobile terminal location.

28. The positioning node of claim 22, further comprising means for reconstructing a complete pseudorange from a measured truncated pseudorange based on the time of signal reception at the mobile terminal and an approximate mobile terminal location.

29. A communication system with means for determining a location of a mobile terminal in a cellular communication network, the mobile terminal arranged with means for receiving signals from satellites of a satellite-based positioning system, the communication system comprising the positioning node of claim 21.

30. A method for determining a location of a mobile terminal in a cellular communication network, comprising:
   receiving, at the mobile terminal, signals from a plurality of satellites;
   determining, at the mobile terminal, a signal reception time and a plurality of pseudoranges of the plurality of satellites;
   performing a first location calculation, at the mobile terminal or at a position node of the cellular communication network, of calculating a first location of the mobile terminal based on the signal reception time and the plurality of pseudoranges;
   determining, at the mobile terminal or at the position node, whether a quality of the first location is within a first quality threshold;
   determining, at the mobile terminal or at the position node, the first location as the location the mobile terminal when it is determined that the first location is within the first quality threshold; and
   performing, at the mobile terminal or at the position node, a second location calculation, a third location calculation, or both when it is determined that the first location is not within the first quality threshold,
   wherein the second location calculation corrects for an error in the signal reception time determined at the mobile terminal and is based on a transmission offset parameter not used in the first location calculation, and
   wherein the third location calculation corrects for error or errors in the plurality of pseudoranges determined at the mobile terminal.

31. The method of claim 30, wherein at least one of the first, second, and third location calculations is performed at the mobile terminal.

32. The method of claim 30, wherein the third location calculation comprises:
   identifying, at the mobile terminal or at the position node, an outlier pseudorange of the plurality of pseudoranges, the outlier pseudorange being the pseudorange that make a highest contribution to an error in the first location calculated when the first location calculation is performed; and
   performing the first location calculation, at the mobile terminal or at the position node, of calculating the first location of the mobile terminal based on the signal reception time and the plurality of pseudoranges minus the outlier pseudorange.

33. The method of claim 30, wherein the third location calculation comprises:
   identifying, at the mobile terminal or at the position node, an outlier pseudorange of the plurality of pseudoranges, the outlier pseudorange being the pseudorange that make a highest contribution to an error in the second location calculated when the second location calculation is performed; and
   performing the second location calculation, at the mobile terminal or at the position node, to correct for the error in the signal reception time determined at the mobile terminal based on the signal reception time, the plurality of pseudoranges minus the outlier pseudorange, and the transmission offset parameter.

* * * * *

UNITED STATES PATENT AND TRADEMARK OFFICE
CERTIFICATE OF CORRECTION

| | | |
|---|---|---|
| PATENT NO. | : 7,633,436 B2 | Page 1 of 1 |
| APPLICATION NO. | : 10/589752 | |
| DATED | : December 15, 2009 | |
| INVENTOR(S) | : Kangas | |

It is certified that error appears in the above-identified patent and that said Letters Patent is hereby corrected as shown below:

In Column 19, Line 65, in Claim 7, after "method of" delete "any of".

In Column 21, Line 55, in Claim 20, delete "based" and insert -- based on --, therefor.

In Column 22, Line 19, in Claim 22, delete "comprising;" and insert -- comprising: --, therefor.

In Column 23, Line 2, in Claim 27, delete "at" and insert -- a --, therefor.

Signed and Sealed this

Sixteenth Day of March, 2010

David J. Kappos
*Director of the United States Patent and Trademark Office*